United States Patent [19]

Larsson et al.

[11] 4,236,364

[45] Dec. 2, 1980

[54] REINFORCED BUILDING COMPONENT

[75] Inventors: Arnold Larsson; Assar Elwing, both of Linkoping, Sweden

[73] Assignee: AB Östgöta-Byggen, Linkoping, Sweden

[21] Appl. No.: 912,279

[22] Filed: Jun. 5, 1978

[30] Foreign Application Priority Data

Apr. 24, 1978 [SE] Sweden .............................. 7804662

[51] Int. Cl.² .............................................. E04B 1/16
[52] U.S. Cl. ......................................... 52/383; 52/650
[58] Field of Search .......................... 52/383, 410, 650

[56] References Cited

U.S. PATENT DOCUMENTS

| | | | |
|---|---|---|---|
| 3,299,597 | 1/1967 | Davey | 52/410 X |
| 3,407,560 | 10/1968 | Baumann | 52/383 |
| 3,494,088 | 2/1970 | Körner | 52/650 |
| 4,104,842 | 8/1978 | Rockstead et al. | 52/383 |
| 4,117,639 | 10/1978 | Steenson et al. | 52/410 |

FOREIGN PATENT DOCUMENTS 2021192  4/1972  Fed. Rep. of Germany ............. 52/410

Primary Examiner—J. Karl Bell
Attorney, Agent, or Firm—Beveridge, DeGrandi, Kline & Lunsford

[57] ABSTRACT

A reinforced building component for buildings and like structures having a reinforcement consisting of a number of juxtaposed wires bent in zigzag and an insulation preferably consisting of insulating material that is foamed at the reinforcement. The central parts of the bent wires are located within the building component while the crests of the wires extend outside the two sides of the slab so that clamps are formed as integral parts of the reinforcement wires at both sides of the slab.

1 Claim, 12 Drawing Figures

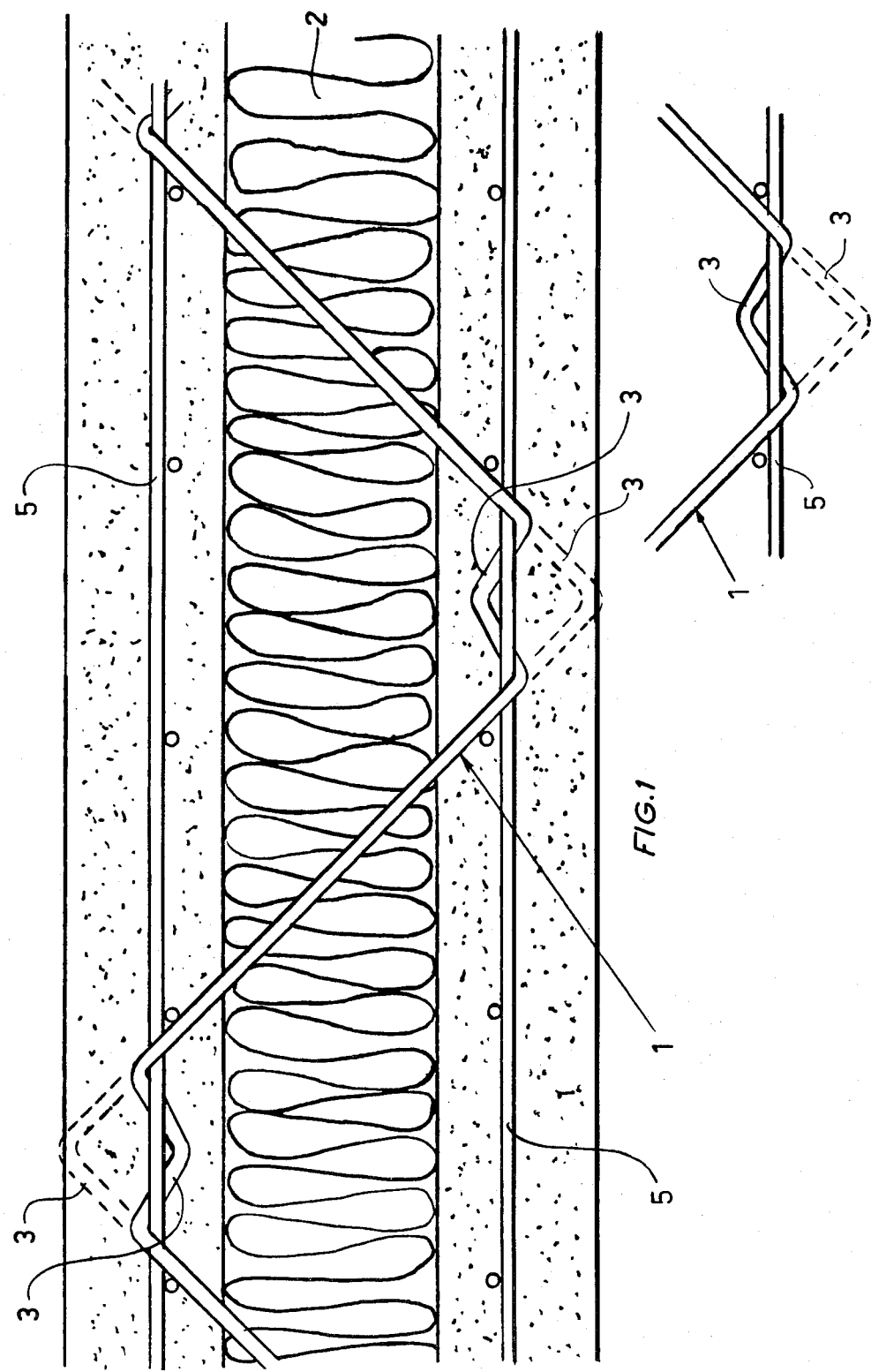

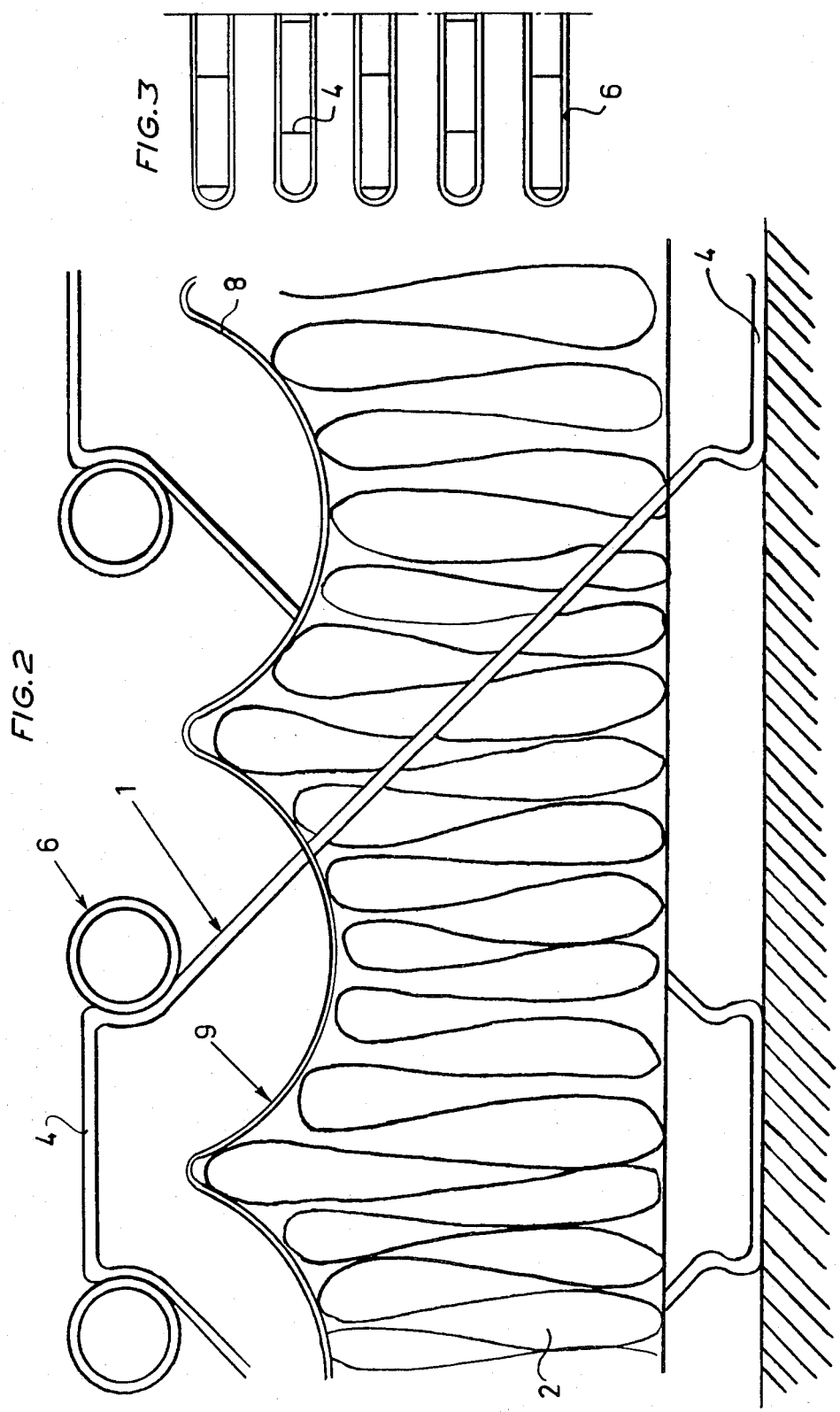

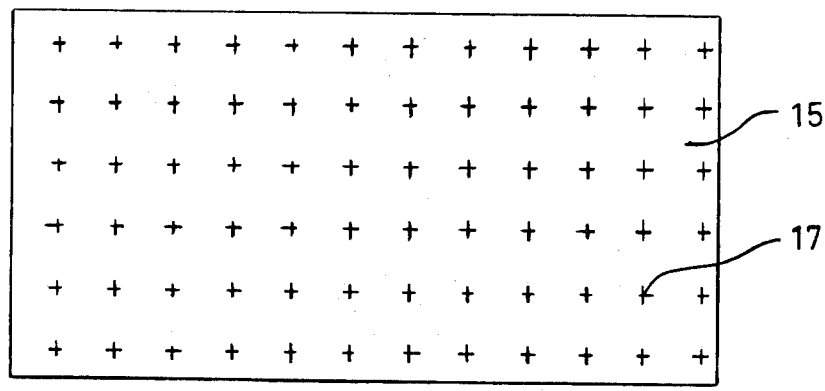
FIG. 6
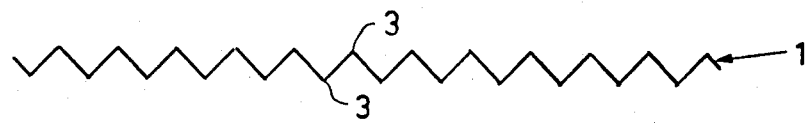
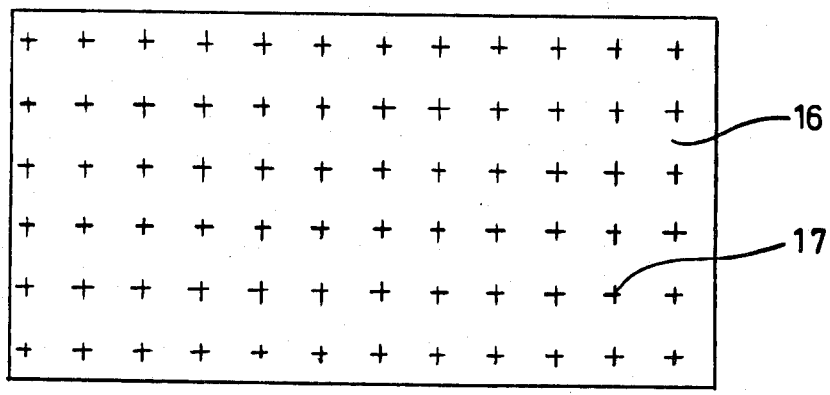

REINFORCED BUILDING COMPONENT

The present invention relates to a reinforced building component, a method of making such a component, and a forming machine for the manufacture thereof.

In reinforced building components for buildings and like structures, the insulation preferably consists of an insulating material that is foamed at the reinforcement, and the reinforcement consists of a number of juxtaposed wires bent in zigzag. Characteristic of the invention is that the central parts of the zigzag wires are located within the building component, which consists of a slab, while the crests of the wires extend outside both sides of the insulating material so that clamps or the like are formed as integral parts of the reinforcement wires at both sides of the insulating material.

It has been found by way of experiments in the making and mounting of reinforced building components that the great advantages achieved by the present invention can be obtained in connection with a great variety of reinforced building components that must not necessarily consist of foamed insulating material. Thus, the building component may consist of e.g. concrete or lightweight concrete. Other mouldable or foamable materials may also be used to constitute the building component, formed as a slab, outside the two sides of which the crests of the zigzag wires extend.

This invention also relates to a method of making the reinforced building component. It is characterized in that the wires bent in zigzag are placed in juxtaposition between two planes in such a way that the crests of the wires extend through the planes, and that the material of the building component is introduced between the planes and is formed therebetween.

The invention also concerns a forming machine for the manufacture of the reinforced building component, comprising a plurality of juxtaposed, plane forming units which are movable towards and away from each other and between which the building components are to be formed. Characteristic of this machine is that the forming units are provided with a large number of clamp ties which the wire crests in adjacent reinforcements are adapted to engage in such a way that the crests overlap each other, said clamp ties including movable locking pins or the like which are adapted to engage, during the forming operation, in the space between the overlapping crests.

The invention will be described in more detail hereinafter with reference to the accompanying drawings which illustrate various embodiments of the reinforced building component, the method of making such a component, and the forming machine for the manufacture thereof, and in which:

FIG. 1 is a cross-sectional view of an embodiment of the building component, in which the building component is provided with reinforced concrete layers on both sides;

FIG. 2 is a cross-sectional view of an embodiment of the building component which at one side cooperates with a pipe coil;

FIG. 3 is a top plan view of the pipe coil on a reduced scale;

FIG. 6 is a side view of two forming units included in another machine;

Figure 4:
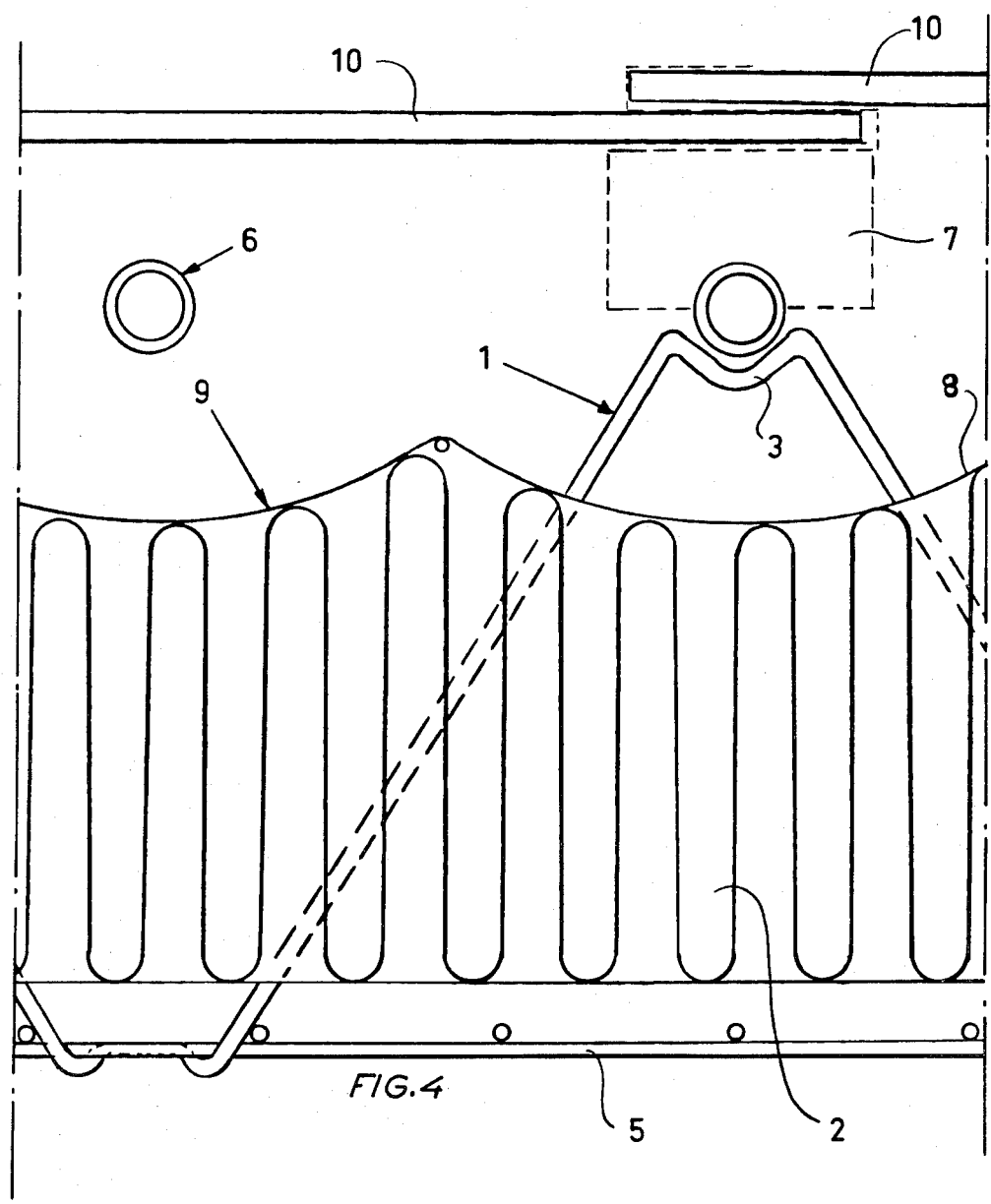
FIG. 4 shows a modification of the embodiment of FIG. 2.

The reinforcement consists of a number of wires or rods 1, bent in zigzag, which suitably may be made of stainless steel or like material. These wires 1 are spaced apart in parallel relationship. According to an alternative the wires are positioned opposite each other while according to another alternative they are alternately offset relative to each other.

The central parts of the wires 1 are located within the building component 2, which consists of a slab, while the crests 3 and 4 of the wires extend outside the two sides of the slab 2 so that clamps or the like are formed as integral parts of the reinforcement wires 1 at both sides of the slab 2. These clamps, defined by the crests 3 and 4, are of the utmost importance for the manufacture as well as the mounting of the building component.

As appears from FIGS. 1-4, the crests 3 and 4 of the wires 1 are adapted, at least at one side of the slab 2, to be mechanically connected to a wire lattice 5 or pipe coil 6 bent in S-shape.

According to FIG. 1 the crests 3 are bent over wires of the wire lattice 5. In certain cases the building component is provided with a wire lattice 5 at one side only but in the normal case the building component is provided with a wire lattice 5 at both sides.

According to the embodiment illustrated in FIGS. 2 and 3 a portion of the crests 4 is flared to form a snapping means adapted to be fastened to the pipe coil 6 for establishing a mechanical connection between the wire 1 and the pipe coil 6. In a corresponding manner the snapping means can engage adjacent wires of a lattice 5.

In the embodiment illustrated in FIG. 4 the pipe coil 6 is adapted to engage with the bent-down crests 3 of the reinforcement wires 1 and to be fixed to the crests 3 by means of special fittings 7.

The pipe coil 6 is intended to absorb solar energy and for this reason it is adapted to cooperate with the crests 3 and 4 at one side only of the slab 2, while the crests 3 and 4 at the other side of the slab 2 are to be inserted in an underlying construction element of a building or the like. In this case the slab 2, which preferably consists of insulating material, is provided with an aluminium foil 8 or other radiation-reflecting material on the side facing the pipe coil 6. This foil 8 is adapted to reflectors 9 in or adjacent the focus of which the pipes of the coil 6 are positioned.

The fitting 7 shown in FIG. 4 is formed in such a way that it not only fixes the pipe coil 6 to the bent crests 3 but also retains overlapping window panes 10 to the side of the building component facing the sun.

Figure 5:
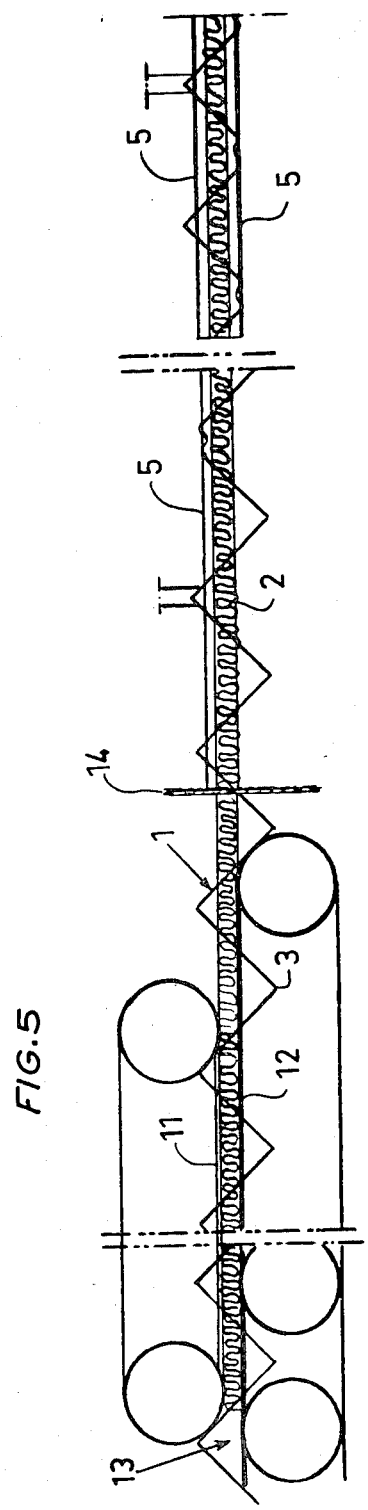
FIG. 5 is a side view showing the method of making the building component as carried out in a machine for the manufacture thereof.

As appears from the method as illustrated in FIG. 5 for the making of the building component, the wires 1 are first bent in zigzag. After that the zigzag-shaped wires 1 are placed beside each other in such a way between two planes 11 and 12 that the crests 3 and 4 of the wires 1 will extend through and outside the planes 11 and 12. The material of the building component 2, which suitably consists of a foamable insulating material, is introduced at 13 between the planes 11 and 12 and is formed therebetween. As will appear from the following detailed description of the machine for the manufacture of the reinforced building component, the planes 11 and 12 may be stationary or be part of closable forms. However, according to FIG. 5 the planes 11 and 12 consist of two driven endless conveyor belts, situated opposite each other, which permit continuous manufacture. The continuously fabricated, reinforced building component is cut at 14 to suitable lengths which first are provided with a lattice 5 on one side and then, after turning, with a lattice 5 on the other side.

FIG. 6 shows a pair of forming units 15 and 16 between the planes of which the reinforced building component is adapted to be formed. The forming units 15 and 16 are provided with a large number of clamp ties 17 which the crests 3 of the reinforcement wires 1 are adapted to engage for fixing the forming units 15 and 16 at a predetermined interval corresponding to the thickness of the slab 2. The clamp ties 17 in the two units 15 and 16 are laterally offset relative to each other for adjustment to the wire crests 3.

Figure 7:
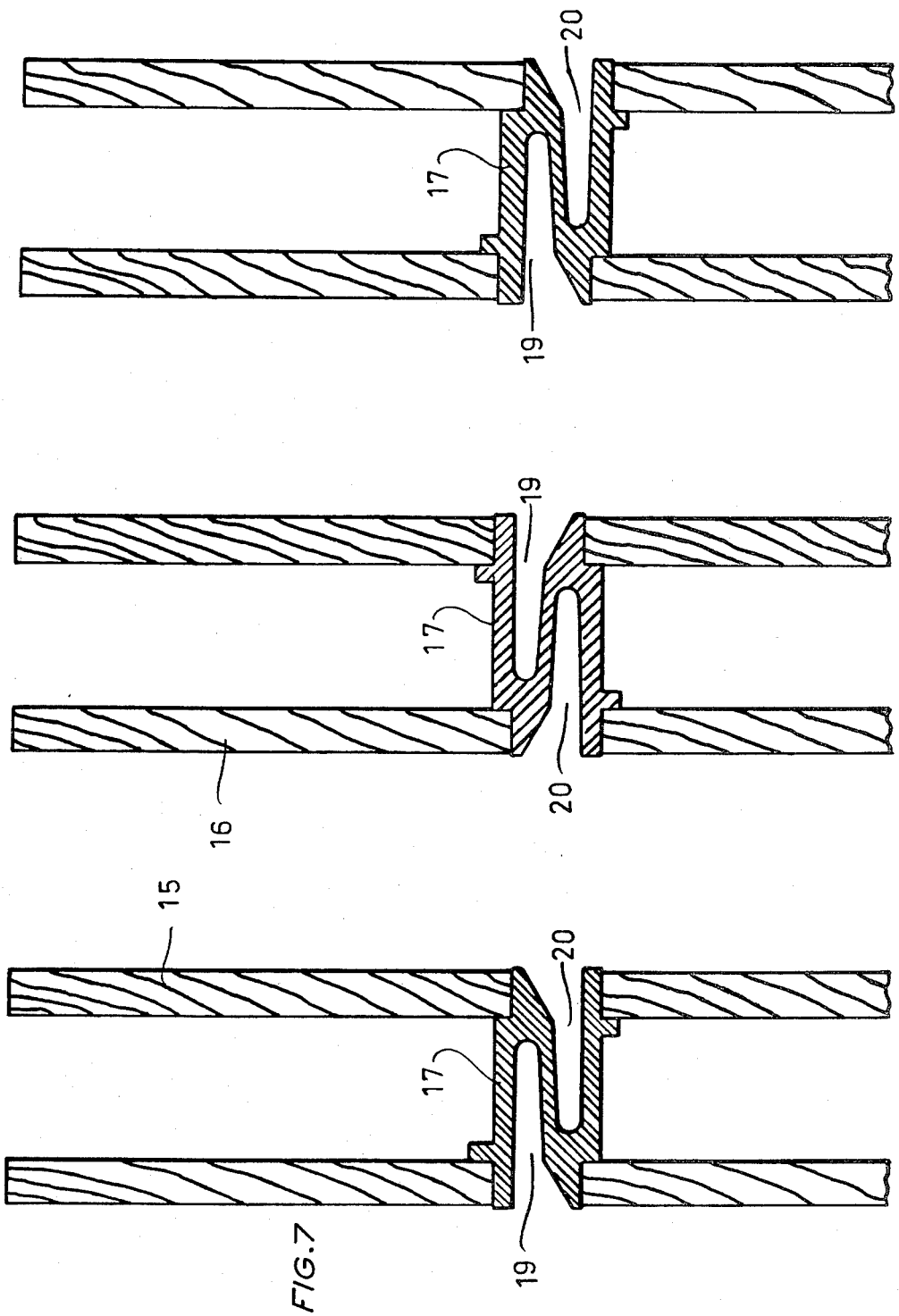
FIG. 7 is a cross-sectional view showing on a larger scale some juxtaposed forming units included in the machine.
Figure 8:
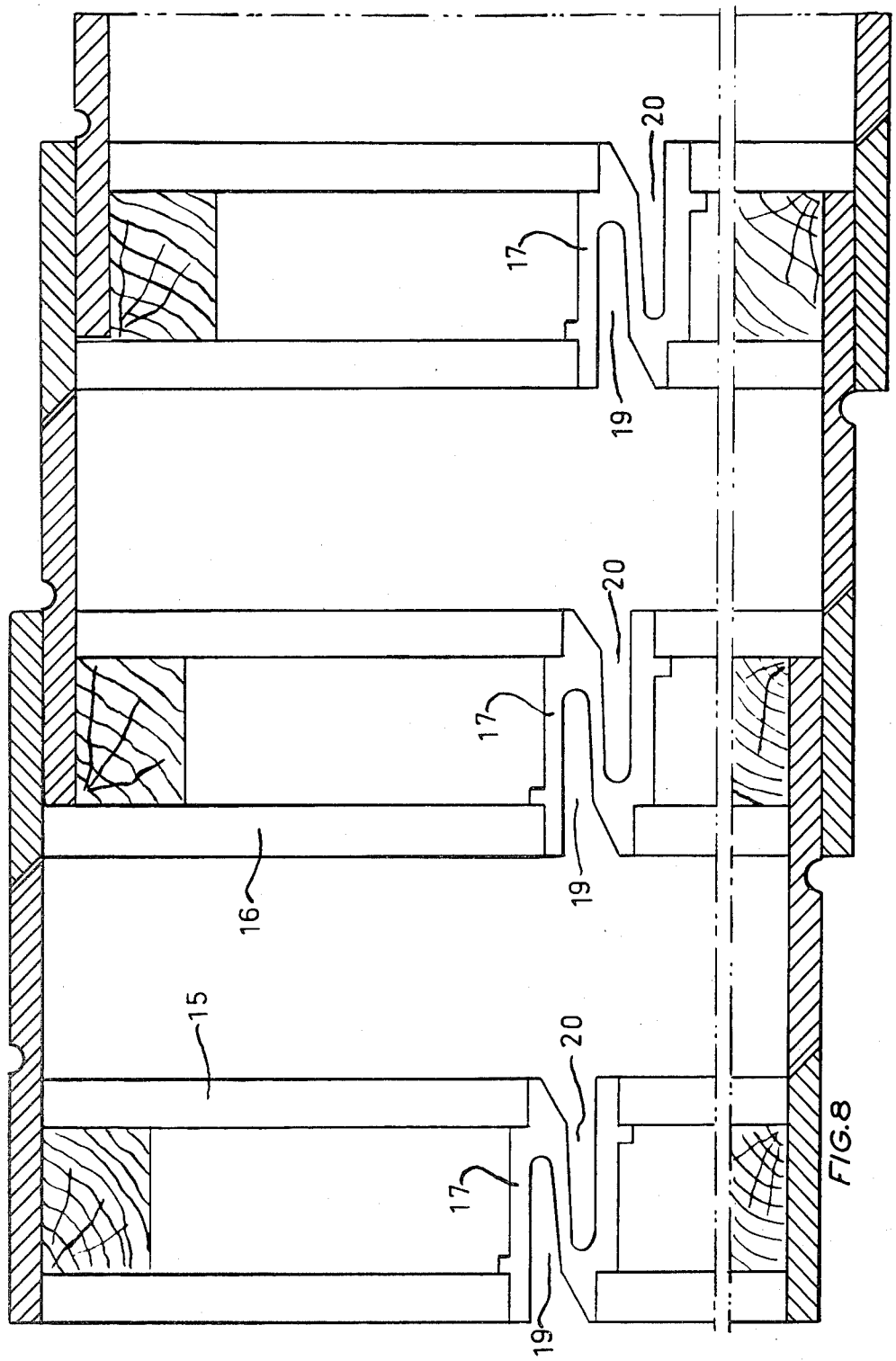
FIG. 8 is a modified embodiment of the forming units of FIG. 7.
Figure 10:
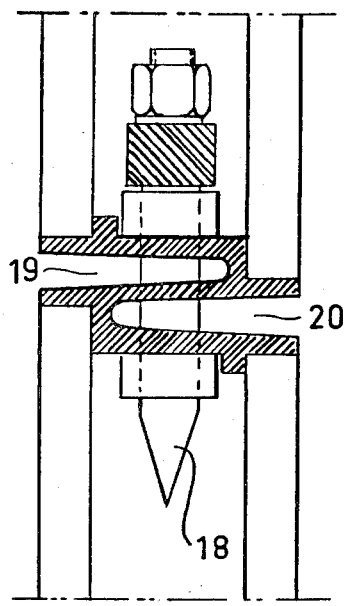
FIGS. 9-12 show, on one hand, a side view and, on the other hand, three relatively perpendicular cross-sections of a clamp tie included in the forming units.
Figure 9:
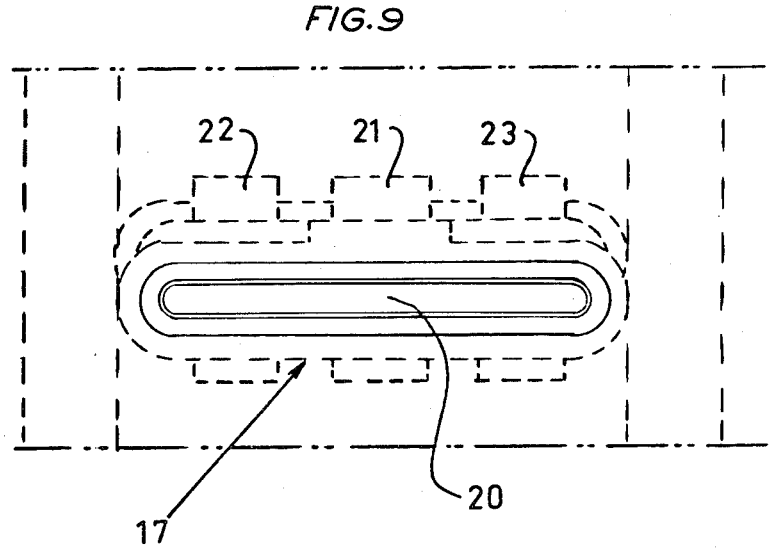
Figure 11:
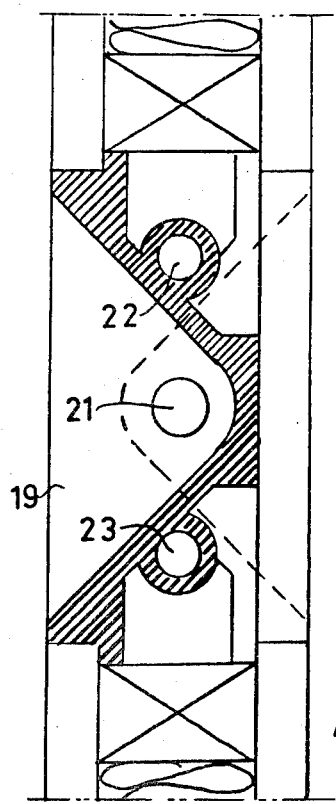
Figure 12:
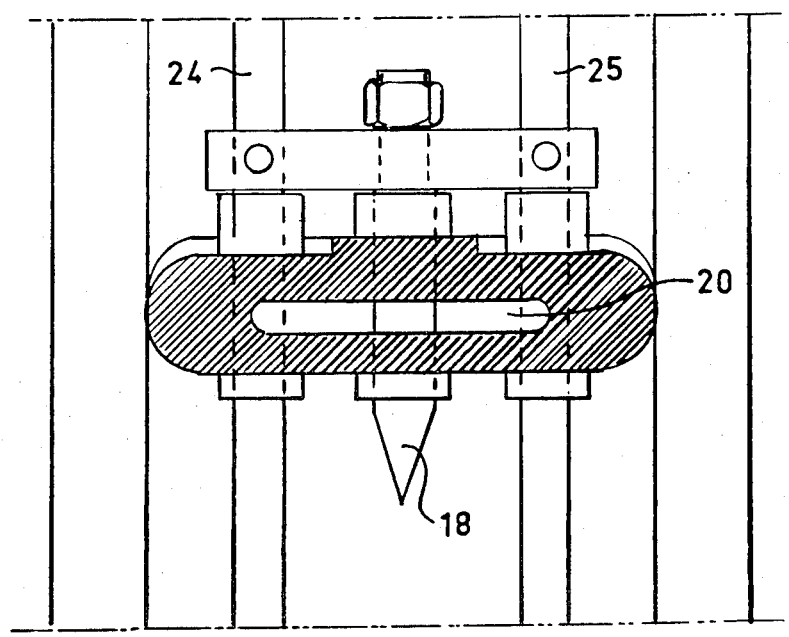

As is apparent from FIGS. 7 and 8, the forming machine comprises a plurality of juxtaposed plane forming units 15 and 16, which are movable towards and away from each other and between which the building components are adapted to be formed. The forming units 15 and 16 are provided with a large number of clamp ties 17 which the wire crests of adjacent reinforcements are adapted to engage in such a way that the crests will overlap each other. The clamp ties 17 include movable locking pins 18 or the like which are adapted to engage, during the forming operation, the space between the overlapping crests. The reinforcements will thus stabilize the forming units 15 and 16 during the forming of the building components.

Each clamp tie 17 includes two oppositely directed pockets 19 and 20 for one wire crest 3 at each of the two adjacent reinforcements. These two pockets 19 and 20 are offset relative to each other to permit overlapping of the wire crests 3.

In the embodiment according to FIG. 7 the clamp ties 17 in the forming units 15 and 16 are directed towards each other alternately so that upper pockets 19 are positioned opposite to upper pockets 19 and lower pockets 20 are positioned opposite to lower pockets 20. In the embodiment according to FIG. 8 the clamp ties 17 are equally oriented in the forming units 15 and 16 which are offset relative to each other in such a way that lower pockets 20 and upper pockets 19 in opposite clamp ties 17 are positioned opposite to each other.

In the embodiments of FIGS. 7 and 8 the forming units 15 and 16 are normally arranged so as to hang down in at least substantially vertical direction and so that they are horizontally displaceable at their upper ends. To permit vertical adjustment of the forming units 15 and 16 they may advantageously hang in right- and left-threaded screws. By means of these screws a safe sealing of the forms may thus be provided for.

FIGS. 9-12 show a preferred embodiment of the clamp tie 17. Thus, the clamp tie 17 is provided with two oppositely directed pockets 19 and 20 which are vertically offset relative to each other. The clamp tie 17 includes three vertical passages 21-23 of which the central passage 21 serves as a guide for the locking pin 18 which, during casting, is adapted to engage the space between the overlapping crests 3. The two outer passages 22 and 23 are passed by vertically movable rods 24 and 25 which are attached to the clamp tie 17. These rods 24 and 25 are common to all the superposed clamp ties 17 so that their locking pins 18 can be moved into and out of their locking positions at the same time.

The invention is not restricted to that described above and shown in the drawings but may be modified within the scope of the appended claims.

What we claim and desire to secure by Letters Patent is:

1. A reinforced building component comprising a slab, a reinforcement which includes a number of juxtaposed wires bent in zigzag shape, said zigzag wires having central parts located within the slab, while the crests of the wires extend outside both sides of the slab, a lattice lying outside said slab and including interconnected transverse and longitudinal wires, said zigzag wires having their crests bent over to clampingly engage the wires of said lattice to connect the zigzag wires to the lattice wires mechanically.

* * * * *